United States Patent
Courchesne et al.

(10) Patent No.: US 12,365,208 B1
(45) Date of Patent: Jul. 22, 2025

(54) TRACK KIT CONNECTION SYSTEM

(71) Applicant: Bombardier Recreational Products Inc., Valcourt (CA)

(72) Inventors: Mathieu Courchesne, Sherbrooke (CA); Patrick Mathieu, Shefford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 18/652,028

(22) Filed: May 1, 2024

(51) Int. Cl.
    *B60G 7/00* (2006.01)
    *B60G 7/02* (2006.01)
    *B62D 55/04* (2006.01)
    *B62D 55/104* (2006.01)

(52) U.S. Cl.
    CPC ............. *B60G 7/001* (2013.01); *B60G 7/005* (2013.01); *B60G 7/008* (2013.01); *B60G 7/02* (2013.01); *B62D 55/04* (2013.01); *B62D 55/104* (2013.01)

(58) Field of Classification Search
    CPC ........ B60G 7/001; B60G 7/005; B60G 7/008; B60G 7/02; B62D 55/04; B62D 55/104
    See application file for complete search history.

(56) References Cited

U.S. PATENT DOCUMENTS

| | | | |
|---|---|---|---|
| 11,827,070 B2 * | 11/2023 | Bell | B60G 7/005 |
| 2020/0189671 A1 * | 6/2020 | Lussier | E02F 9/02 |
| 2023/0060865 A1 * | 3/2023 | Couture | B62D 55/104 |

FOREIGN PATENT DOCUMENTS

| CA | 2677421 C | * | 1/2017 | ............ B62D 55/04 |
| CN | 117163159 A | * | 12/2023 | ............ B60G 3/00 |
| EP | 4428010 A1 | * | 9/2024 | ............ B60G 15/06 |
| GB | 2607129 A | * | 11/2022 | ............ B60G 3/06 |
| RU | 2378144 C2 | * | 1/2010 | ............ B62D 15/00 |
| WO | WO-2006066406 A1 | * | 6/2006 | ............ B62D 15/00 |

* cited by examiner

*Primary Examiner* — Drew J Brown
(74) *Attorney, Agent, or Firm* — Bochner PLLC; Joseph Farco

(57) ABSTRACT

A track conversion bracket comprises a U-shaped structure having two arms, a body, and a head. A hexagonal-shaped aperture may be located partially into the thickness of the head, the body, or combinations thereof to affix fasteners to couple an anti-rotation device to the track conversion bracket. A plurality of circular apertures may pass through the thickness of each of the two arms to couple the same to corresponding apertures in a weldment formed by converging members of an A-arm to which a vehicle knuckle is interconnected.

20 Claims, 5 Drawing Sheets

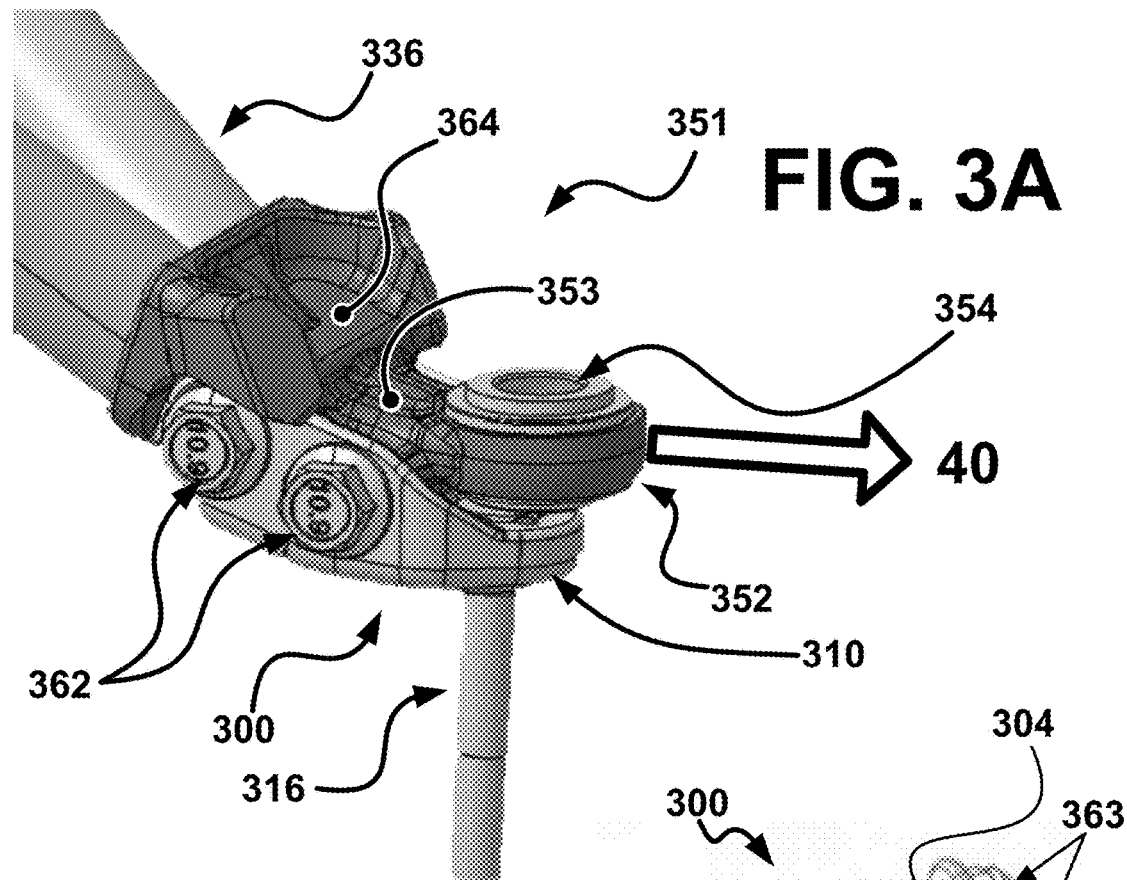
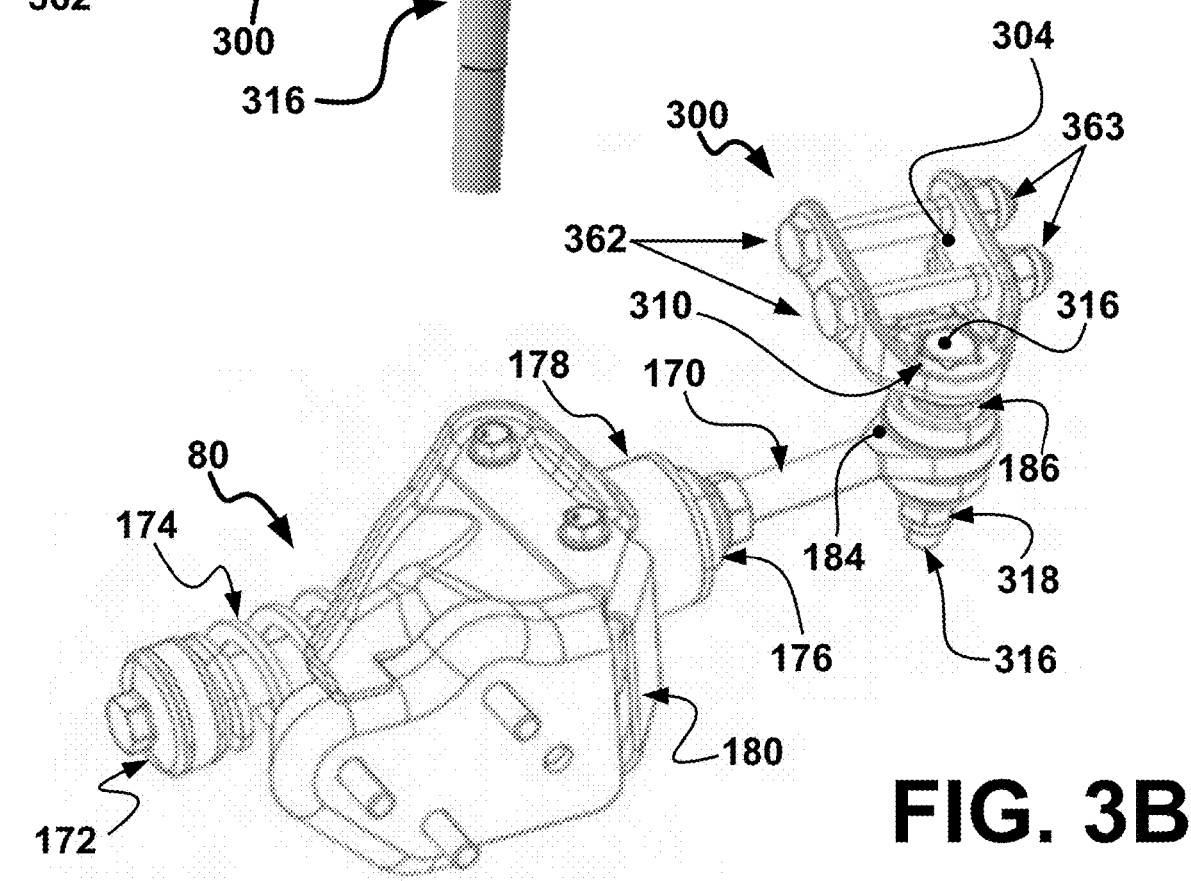

TRACK KIT CONNECTION SYSTEM

FIELD OF THE INVENTION

The present invention relates to tracked vehicles and track kit connection systems and, more specifically, to improvements in enabling track kit attachment to off-road vehicles that use wheels to traverse rough and/or uneven terrain, such as, for example side-by-side vehicles and ATVs.

BACKGROUND

Side-by-side off-road vehicles (SSVs), all-terrain vehicles (ATVs) and similar vehicles are used for utility and recreational purposes. Some users, depending on the terrain conditions, may decide to change the ground-engaging wheels with which the vehicle is originally equipped with a track assembly. Track assemblies are particularly useful for instance when travelling over deep snow as the increased contact area between the track assemblies' tracks and the ground allows for greater floatation. Such track assemblies are typically offered as aftermarket kits.

A track assembly typically includes a frame, a drive sprocket rotationally connected to the frame, one or more idler wheels rotationally connected to the frame, an endless track disposed around the frame, the drive sprocket and the one or more idler wheels, a track tensioner and an anti-rotation device. The drive sprocket is connected to a wheel hub of the vehicle so as to be driven by the vehicle's motor, and thereby drive the endless track.

Unlike in a wheel where the entire wheel rotates, in a track assembly only the endless track and the drive sprocket make full rotations. The frame is allowed to rotate so as to pitch up and down in order to follow the terrain. However, it is desired to limit the amount of pitching of the frame. The anti-rotation device is provided to limit rotation of the frame and therefore of the track assembly. The anti-rotation is connected between the frame assembly and a portion of the vehicle.

Since vehicles originally designed to operate on wheels do not have anti-rotation devices, they do not have attachment points for connecting the anti-rotation device. For this reason, after-market suppliers of track assembly kits include various plates or adapter to be attached to the suspension of the vehicle in order to provide an attachment point for the anti-rotation device. Due to the forces applied by the anti-rotation device and the large number of times such forces are applied, these plates and adapters tend to be bulky and heavy. Also, multiple plates and adapters need to be provided by the aftermarket manufacturer if it is desired that the track assembly kit fits on different vehicles. As such, this adds costs.

Another consideration to consider when installing a track assembly on a vehicle originally designed to operate on wheels, is that the track assembly will likely be longer than the diameter of the original wheel. As such, there is a likelihood that a front track assembly that needs to be steered could interfere with the body or other components of the vehicle once a certain steering angle is reached.

An example of such track assemblies may be found in co-pending U.S. patent application Ser. No. 17/899,793, the entire disclosures of which being incorporated herein by reference in its entirety.

SUMMARY

An exemplary suspension assembly for an off-road vehicle may comprise an A-arm made up of a first member having a first end and a second end and a second member having a first end and a second end. An exemplary first end of the first member and first end of the second member may each rotatably interconnect to a frame of a vehicle about an axis of rotation. An exemplary second end of the first member and second end of the second member may be joined to one another at an interconnection located distal from the axis of rotation. Further, an exemplary A-arm may comprise an aperture having a central axis substantially parallel to the axis of rotation and through the thickness of the interconnection. Additionally, in an exemplary suspension assembly, an annulus may be disposed on the interconnection proximal to the aperture that is also configured to interconnect a knuckle to the vehicle via the A-arm, The exemplary suspension assembly may further comprise a bracket configured to attach to the interconnection of the A-arm, such that the bracket has a plurality of openings through its thickness of which at least one of the plurality of openings is concentric with the aperture when attached to the interconnection of the A-arm. Additionally, at least one other of the plurality of openings in the bracket is configured to receive a fastener for interconnecting an anti-rotation device to the vehicle via the A-arm.

In addition to the previously described embodiment and/or as an alternative to any other described exemplary embodiment, an exemplary suspension assembly for an off-road vehicle may further comprise at least two apertures in the interconnection each having a central axis substantially parallel to the axis of rotation.

In addition to the previously described embodiment and/or as an alternative to any other described exemplary embodiment, an exemplary suspension assembly for an off-road vehicle may be configured such that the annulus is substantially aligned with a central axis of the at least one of the plurality of openings configured to receive the fastener for interconnecting the anti-rotation device.

In addition to the previously described embodiment and/or as an alternative to any other described exemplary embodiment, an exemplary suspension assembly for an off-road vehicle may be configured such that a distance between the at least one ball joint and the kingpin axis of the vehicle is between 0 inch and 1 inch.

In addition to the previously described embodiment and/or as an alternative to any other described exemplary embodiment, an exemplary suspension assembly for an off-road vehicle may be configured such that the bracket is a U-shaped structure and at least one of the plurality of openings is through a thickness of an arm of the bracket and at least one of the plurality of openings is through a thickness of a head of the bracket.

In addition to the previously described embodiment and/or as an alternative to any other described exemplary embodiment, an exemplary suspension assembly for an off-road vehicle may be configured such that the at least one of the plurality of openings in the arm of the bracket is concentric with the aperture when the bracket is coupled to the interconnection of the A-arm.

In addition to the previously described embodiment and/or as an alternative to any other described exemplary embodiment, an exemplary suspension assembly for an off-road vehicle may be configured such that the at least one of the plurality of openings in the head of the bracket has a hexagonal cross-section through a portion of the thickness of the bracket.

In addition to the previously described embodiment and/or as an alternative to any other described exemplary embodiment, an exemplary suspension assembly for an off-road vehicle may be configured such that the at least one of the plurality of openings in the head of the bracket has both a hexagonal cross-section and a circular cross-section through the thickness of the bracket.

In addition to the previously described embodiment and/ or as an alternative to any other described exemplary embodiment, an exemplary suspension assembly for an off-road vehicle may be configured such that the at least one ball joint is substantially aligned on the kingpin axis of the vehicle.

In addition to the previously described embodiment and/ or as an alternative to any other described exemplary embodiment, an exemplary suspension assembly for an off-road vehicle may further comprise a track kit comprising the anti-rotation device and interconnected to the A-arm via the anti-rotation device and via the knuckle.

In addition to the previously described embodiment and/ or as an alternative to any other described exemplary embodiment, an exemplary suspension assembly for an off-road vehicle may further comprise at least one ball joint interconnected to one of the annulus and at least one of the plurality of openings in the bracket.

In addition to the previously described embodiment and/ or as an alternative to any other described exemplary embodiment, an exemplary suspension assembly for an off-road vehicle may further comprise a track kit interconnected to the A-arm via the anti-rotation device.

In addition to the previously described embodiment and/ or as an alternative to any other described exemplary embodiment, an exemplary suspension assembly for an off-road vehicle may further comprise at least one ball joint interconnected to one of the annulus and at least one of the plurality of openings in the bracket.

An exemplary method of assembling an anti-rotation device to a vehicle suspension may comprise a variety of steps, such as, interconnecting an anti-rotation device via a hexagonal opening in a bracket that has a U-shaped structure and two arms in which a plurality of openings are found therethrough. Another exemplary step may include attaching the bracket to a weldment of an A-arm that is operationally coupled to a vehicle such that the weldment comprises a plurality of apertures configured to align with each of the plurality of openings in the arms of the bracket. Furthermore, each of the plurality of apertures in the weldment have a central axis that extends in a plane that is parallel with a plane of the surface on which the vehicle is at rest.

In addition to the previously described embodiment and/ or as an alternative to any other described exemplary embodiment, an exemplary method of assembling an anti-rotation device to a vehicle suspension may further comprise a step of interconnecting a knuckle to the weldment of the A-arm via an annulus of the weldment.

In addition to the previously described embodiment and/ or as an alternative to any other described exemplary embodiment, an exemplary method of assembling an anti-rotation device to a vehicle suspension may further comprise a step of aligning a ball joint interconnected to the bracket with a kingpin axis of the vehicle.

In addition to the previously described embodiment and/ or as an alternative to any other described exemplary embodiment, an exemplary method of assembling an anti-rotation device to a vehicle suspension may further comprise a step of interconnecting a track kit to the vehicle via the A-arm and the anti-rotation device.

An exemplary track conversion bracket may comprise a U-shaped structure having two arms, a body, and a head. An exemplary track conversion bracket may also comprise a hexagonal-shaped aperture located partially into the thickness of the head, the body, or combinations thereof. There may further be a plurality of circular apertures through the thickness of each of the two arms with axes in a plane that is perpendicular to a plane in which an axis of the hexagonal-shaped aperture is found and a circular aperture concentric with the hexagonal-shaped aperture. In an alternative embodiment, an exemplary track conversion bracket may be configured such that the arms are spaced apart from one another by the width of the body.

In another exemplary embodiment, the width-running apertures in the weldment of an exemplary A-arm that is configured for use with a an exemplary track conversion kit may be made at the point of manufacture of the A-arm and are not done post-installation of such an exemplary A-arm. According to this embodiment, the width-running apertures are those that pass through the thickness in the A-arm weldment in a direction substantially parallel to the line that spans the V-shaped gap of the A-arm.

DESCRIPTION OF THE DRAWINGS

FIG. 3A illustrates an exemplary improved A-arm and bracket system for a track kit with additional connection features for a track kit.

FIG. 3B illustrates an exemplary improved A-arm bracket system for a track kit operatively coupled to an anti-rotation system for a track assembly.

Figure 1:
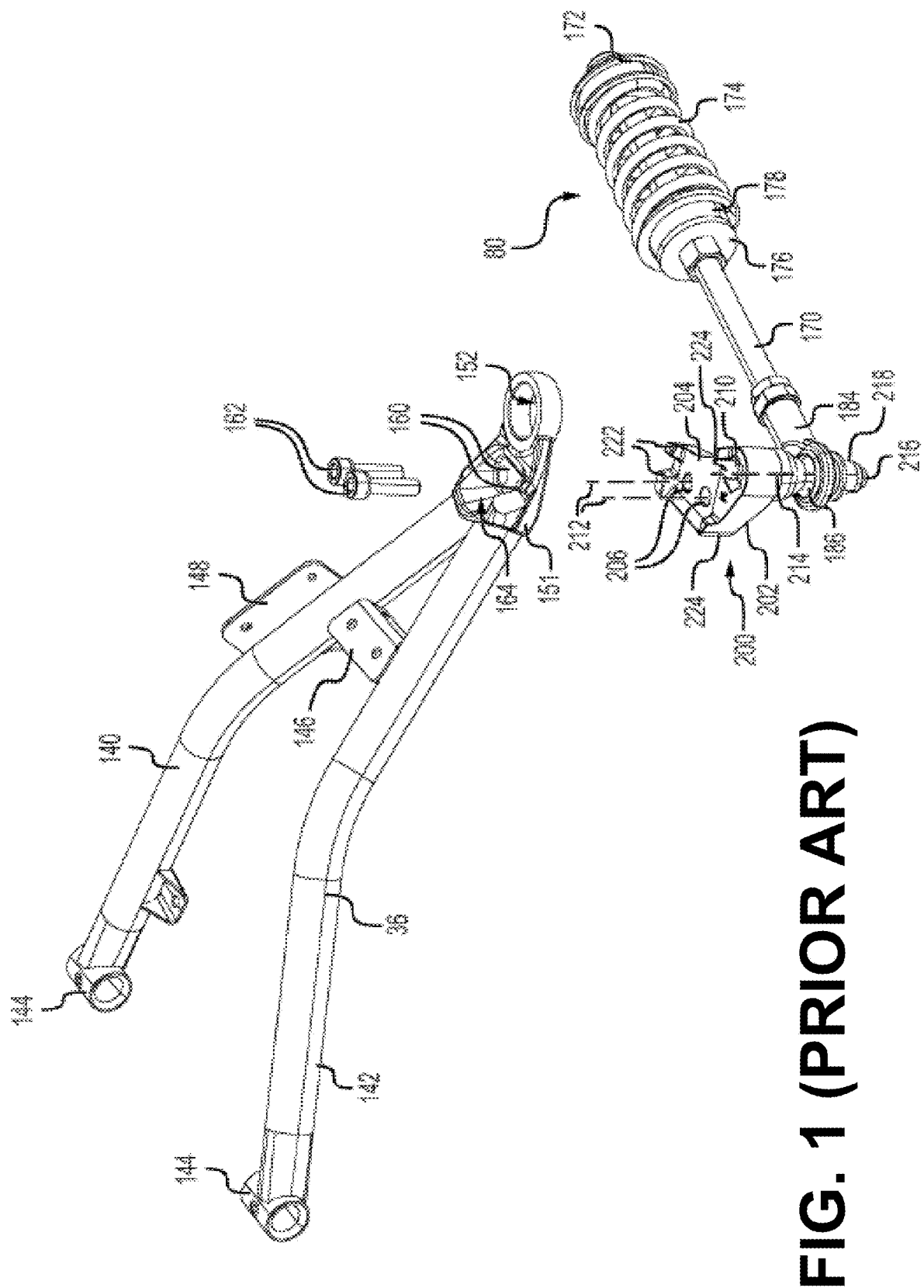
FIG. 1 illustrates a prior art track kit for a vehicular a-arm as illustrated and described in co-pending U.S. patent application Ser. No. 17/899,793.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

While the disclosures herein contemplate use of exemplary A-arm weldments and brackets to be described in any vehicle and/or recreational vehicle, including recreational vehicles of the type previously indicated and/or known to those skilled in the art, the use of an exemplary A-arm and/or A-arm bracket for use in a track kit for adaptation of a side-by-side ("SSV") vehicle is for illustration only and not limiting to the intended uses for which such disclosures can be put. An exemplary off-road vehicle (e.g., an SSV) may comprise a suspension system in which a track kit may be interchangeable with the wheels of the vehicle that would be present in the vehicle's as-sold condition. Such wheeled off-road vehicles configured for interchangeable track kits may be illustrated and described in co-pending U.S. patent application Ser. No. 17/899,793, the entire disclosures of which being incorporated herein by reference in its entirety, but with particular reference to the disclosures related to FIG. 1 of U.S. patent application Ser. No. 17/899,793.

Referring to the illustrative embodiment of FIG. 1, a lower A-arm 36 has a front member 140 and a rear member 142 that converge toward each other. Sleeves 144 are connected to the proximal ends of the front and rear members 140, 142. The sleeves 144 are used to pivotally connect the proximal end of the lower A-arm 36 to the frame 12 of the vehicle 10. A bracket 146 is connected longitudinally between the front and rear members 140, 142. Another bracket 148 is connected to the front member 140. The distal end portion 151 of the lower A-arm 36 defines an aperture 152. As illustratively provided in FIG. 1, the distal end portion 151 of the lower A-arm 36 corresponds to the portion of the lower A-arm 36 that is connected to the distal ends of the front and rear members 140, 142. A ball joint 154 (shown in FIGS. 2 and 3A) is received in aperture 152 and is connected to a lower portion of the knuckle 40 (shown in FIG. 4), thereby pivotally connecting the knuckle 40 to the distal end portion 151 of the lower A-arm 36.

With continued reference to FIG. 1, the lower A-arm 36 also defines two fastener apertures 160 in its distal end portion 151 that receive two threaded fasteners 162. In this illustrative embodiment, the threaded fasteners 162 may be socket head cap screws, but other types of fasteners may be contemplated. The heads of the threaded fasteners 162 inserted through the fastener apertures 160 are disposed in a recess 164 defined in the distal end portion 151 of the lower A-arm 36. The fastener apertures 160 are sized to receive the fasteners 162 and are drilled or otherwise machined in the distal end portion 151 of the lower A-arm 36. Both fastener apertures 160 are disposed laterally between the aperture 152 and the proximal end of the lower A-arm 36. As such, the centers of the fastener apertures 160 are disposed laterally between the center of the aperture 152 and the proximal end of the lower A-arm 36. It is contemplated that in some embodiments, the lower A-arm 36 could define a single fastener aperture 160 or more than two fastener apertures 160, in which case there would be a corresponding number of threaded fasteners 162.

With continued reference to FIG. 1, an anti-rotation device 80 may be coupled to the lower A-arm 36 via a bracket 200. The anti-rotation device 80 has a stabilizing rod 170, a front cap 172 fastened to a front end of the stabilizing rod 170, and a coil spring 174 disposed around the stabilizing rod 170 and abutting a rear side of the front cap 172. A plate 176 is fastened to the stabilizing rod 170 near or at a center thereof. An elastomeric member 178 is connected to a front side of the plate 176. An elastomeric member 178 may be a cylindrical member made of vulcanized rubber, but other types of elastomeric members 178 may be contemplated. A tie rod end 184 is connected to the rear end of the stabilizing rod 170. The tie rod end 184 includes a ball joint 186. As illustratively provided for in FIG. 1, tie rod end 184 defines a rear end portion of the anti-rotation device 80, but other types of anti-rotation devices 80 may be used. For example, instead of having one coil spring 174 and one elastomeric member 178, the anti-rotation device 80 could have two coil springs or two elastomeric members. Alternatively, coil spring 174 could be disposed behind the bracket 180 and the elastomeric member 178 could be disposed in front of the bracket 180.

To connect the rear end portion of the anti-rotation device 80 to the distal end portion 151 of the lower A-arm 36, a bracket 200 is provided. A bracket 200 according to FIG. 1 has a generally L-shaped bracket body 202. The bracket body 202 has an A-arm abutting surface 204 that abuts a bottom of the distal end portion 151 of the lower A-arm 36. The bracket body 202 defines two bracket apertures 206 in the A-arm abutting surface 204. The bracket apertures 206 are aligned with the fastener apertures 160. As such, one of the bracket apertures 206 is disposed forward of the other bracket aperture 206. The fasteners 162 are received in the fastener apertures 160 and bracket apertures 206. Nuts are fastened to the ends of the fasteners 162 protruding below the bracket body 202 thereby fastening the bracket body 202, and therefore the bracket 200, to the distal end portion 151 of the lower A-arm. It is contemplated that in embodiments having a single fastener aperture 160 or more than two fastener apertures, the bracket body 202 would have a corresponding number of bracket apertures 206 aligned with the fastener aperture(s) 160.

As depicted in FIG. 1, bracket body 202 also defines another bracket aperture 210 at a location spaced from the A-arm abutting surface 204. Fastener apertures 160 and the bracket apertures 206 are forward and laterally inward of the bracket aperture 210. In the present embodiment, the central axis 212 of each bracket aperture 206 is parallel to the central axis 214 of the bracket aperture 210. The upper portion of bracket aperture 210 has a hexagonal shape. The rear end portion of the anti-rotation device 80 is fastened to the bracket 200 by a fastener 216 inserted through the bracket aperture 210 and through the ball joint 186. Anti-rotation device 80 is fastened to the distal end portion 151 of the lower A-arm 36 via the bracket 200 and the fasteners 160, 216. As illustrated in FIG. 1, the fastener 216 is a bolt 216 having a hexagonal head. As the hexagonal head of the bolt 216 is received in the hexagonal portion of the bracket aperture 210, the bolt 216 cannot rotate in the aperture 210 and no tool is required to prevent the bolt 216 from rotating as bolt 216 is fastened in its reception location. As can be seen in FIG. 1, the anti-rotation device 80 extends below the distal end portion 151 of the lower A-arm 36 and below the bracket 200.

Bracket 200 has two front protrusions 222 and two rear protrusions 224. The protrusions 222, 224 protrude from the top of the bracket body 202. The two front protrusions 222 are disposed adjacent to the front of the A-arm abutting surface 204 and the two rear protrusions 224 are disposed adjacent to the rear of the A-arm abutting surface 204 as can be seen in FIG. 1. The front protrusions 222 have rear walls that are adjacent to the front of the distal end portion 151 of the lower A-arm 36. Rear protrusions 222 have front walls that are adjacent to the rear of the distal end portion 151 of the lower A-arm 36. Protrusions 222 and 224 prevent rotation about a vertical axis of the bracket 200 relative to the distal end portion 151 of the lower A-arm 36.

Figure 2:
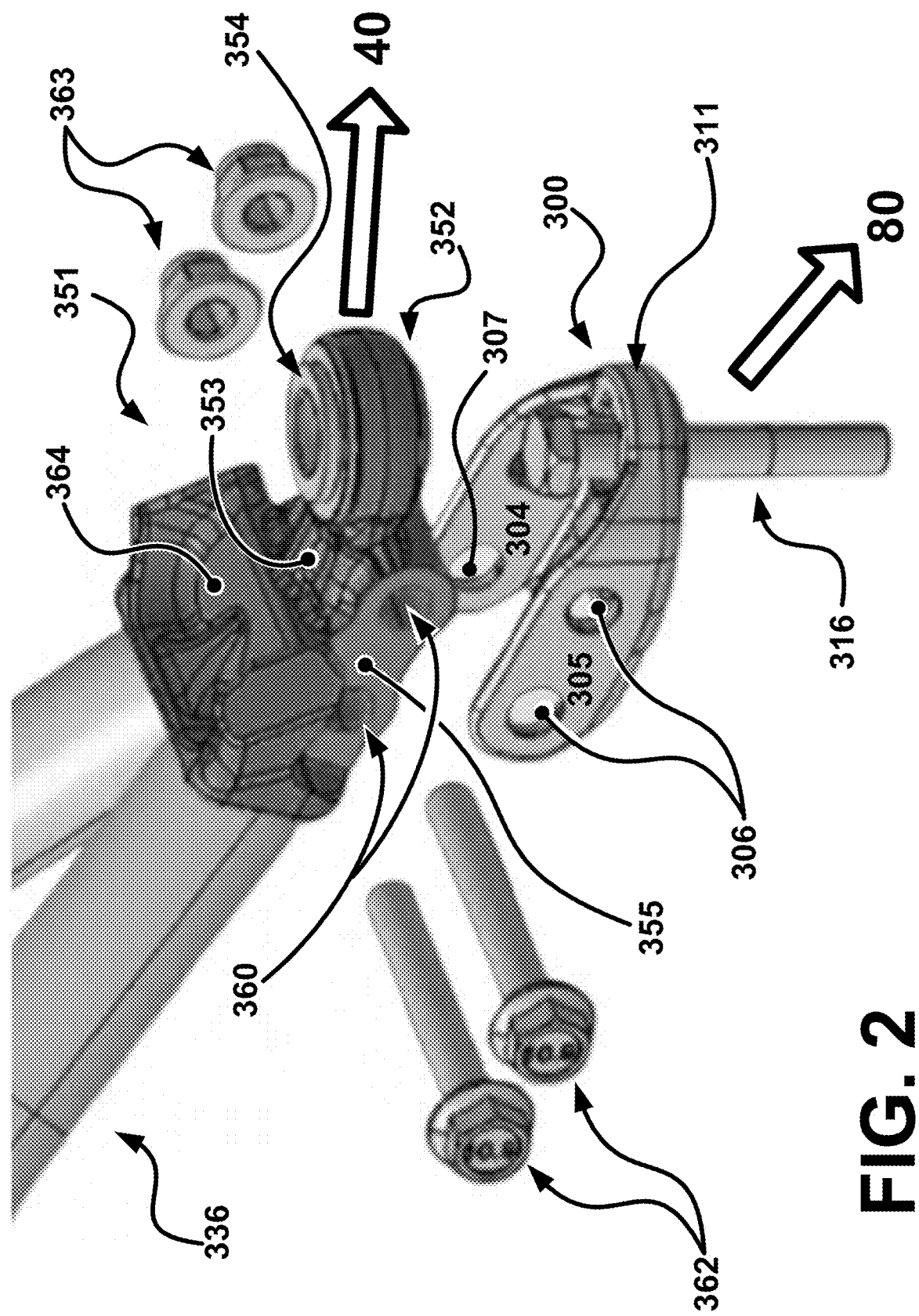
FIG. 2 illustrates an exemplary improved A-arm and bracket system for a track kit.

In contrast to the lower A-arm 36 and bracket 200 in FIG. 1, a lower A-arm 336 and bracket 300 may be depicted in FIG. 2 with numerous improvements and advantages. A-arm 336 comprises a forging 351 that serves as a vertex for the converging left and right portions of the A-arm 336. An exemplary forging 351 may comprise a body 364, neck 353, and annulus 352 into which a ball joint 354 may be operatively inserted. Exemplary forging 352 further comprises one or more apertures 360 running through the width of body 364 in a plane that is substantially orthogonal to the plane in which the central axis of annulus 352 is found. Alternatively, the apertures 360 may have central axes that lay in a plane that is substantially parallel to the plane of the surface on which the vehicle is at rest. Thus, in contrast to the apertures 160 in forging 151 of the A-arm 36 illustrated in FIG. 1, the apertures 360 of forging 351 of A-arm 336 are found in a plane offset from those in which apertures 160 may otherwise be found by approximately 90 degrees. In other words, whereas the apertures 160 of FIG. 1 may have axes that extend along planes that are substantially perpendicular to the plane of the surface on which the vehicle is at rest, the apertures 360 may have axes that extend along planes that are parallel to the plane of the surface on which the vehicle is at rest. As illustratively shown, annulus 352 may be used to couple the rest of A-arm 336 to an exemplary knuckle 40. One exemplary advantage that may be provided by apertures 360 of A-Arm 336 is that they may be manufactured at or simultaneously with the time of manufacture of A-Arm 336. In other words, apertures 360 may pre-exist the final assembly of the vehicle in which they are found and thereby obviate the need for users to drill such apertures 360 into the forging 351 post sale of the vehicle. With continued reference to FIG. 2, an exemplary bracket 300 may be a substantially U-shaped structure that is configured so that its inner brace faces 304 slidingly engage along the aperture face 355 of forging 351. Each guide hole 306 passes from the outer face 305 of the bracket 300 to the inner brace face 304 and additional guide holes 307 pass through the inner brace face 304 to the outer brace face 305 on the opposite side of bracket 300. Guide holes 306/307 enable passage of threaded bolt fasteners 362 therethrough to allow for clamped and threaded engagement of bracket 300 to the apertures 360 of forging 351. Distal of the guide holes 306/307 may be a head 311 of the bracket 300 through which another fastener 316 passes to enable coupling of the bracket 300 to an exemplary anti-rotation device 80 (not shown). An exemplary assembly of an exemplary bracket 300 and A-arm forging 351 may be illustrated by FIG. 3A. As further illustrated in FIG. 3A, the proximity of annulus 352 of forging 351 and head 311 of bracket 300 may provided an appreciation for the tight tolerances and/or spacing requirements of these components and their interconnections (e.g., anti-rotation device 80 and knuckle 40). In an exemplary aspect of the teachings herein, track kits require disengagement of components in and around the wheel hub where space is limited or severely reduced. Therefore, removing fasteners, such as fasteners 162, from an A-arm 36 in order to service a bracket 200 may require maneuvering tools in and around the A-arm assemblies and/or needing to remove the upper A-arm to have sufficient clearance to remove the fasteners 162 from the lower A-arm. Consequently, the arrangement of the exemplary embodiments herein described, illustrated, and claimed in whole or in part improves access to the lower A-arm assembly structures that heretofore have been lacking. It should be understood that an exemplary vehicle to which bracket 300 may be configured to attach can operate in its wheeled mode regardless of whether bracket 300 is attached thereto. Thus, an inventive A-arm 336 as illustrated and described herein may possess the added benefit of interconnecting to bracket 300 one time and still be functional in its wheeled mode as well as its track-kit assembled mode.

With reference to the illustrative embodiment of FIG. 3B, an exemplary bracket 300 may be shown with fasteners 362 placed therein with fastener holders 363 thereon. While an exemplary fastener 362 and holder 363 may be in the form of a nut and bolt, other forms and mechanical fastening arrangements may be suitable, i.e., cotter pin and slotted bolt, snap-fit, screw. The exemplary bracket 300 may also have an aperture 310 in the head portion 312 thereof through which a ball joint fastener 316 passes to couple ball joint 186 and tie rod end 184. Fastener holder 318 may be used to tighten the grip between ball joint 186 and/or tie rod end 184 and bracket 300 about fastener 316. As illustratively provided for in FIG. 3B, the exemplary bracket 300 may be interconnected via the ball joint fastener 316 to an anti-rotation device 80 as described. In an exemplary embodiment, ball joint 186 and the aperture 310 in the head portion 312 of an exemplary bracket 300 may be substantially aligned about a common axis running through the center of the aperture 310. In yet another exemplary embodiment, ball joint 354 and the aperture 310 in the head portion 312 of an exemplary bracket 300 may be substantially aligned about a common axis running through the center of the aperture 310. In yet another exemplary embodiment, ball joint 186, ball joint 354, and the aperture 310 in the head portion 312 of an exemplary bracket 300 may all be substantially aligned about a common axis running through the center of the aperture 310.

Figure 4:
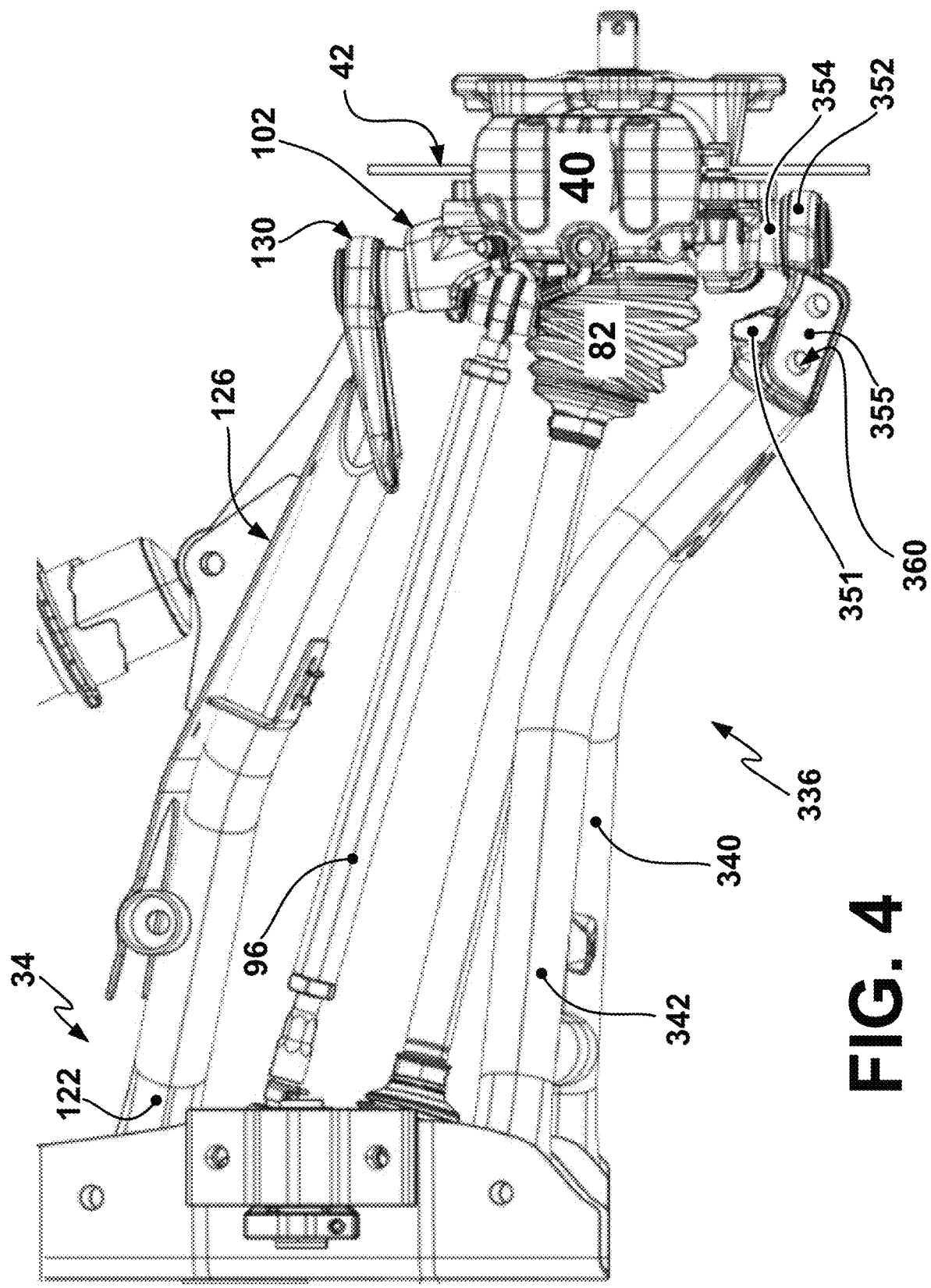
FIG. 4 illustrates an exemplary improved A-arm for a track kit operatively coupled to a knuckle for a track assembly.
Figure 5C:
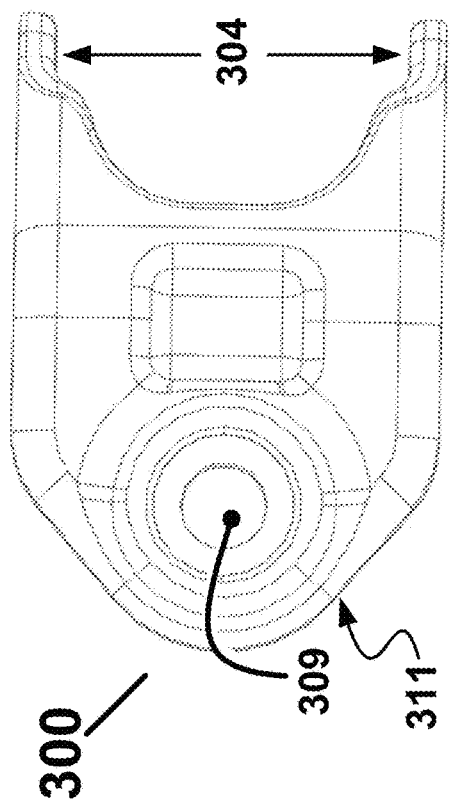
FIGS. 5A-D illustrate various views of an exemplary improved A-arm bracket for use in an improved A-arm track kit assembly system.
Figure 5D:
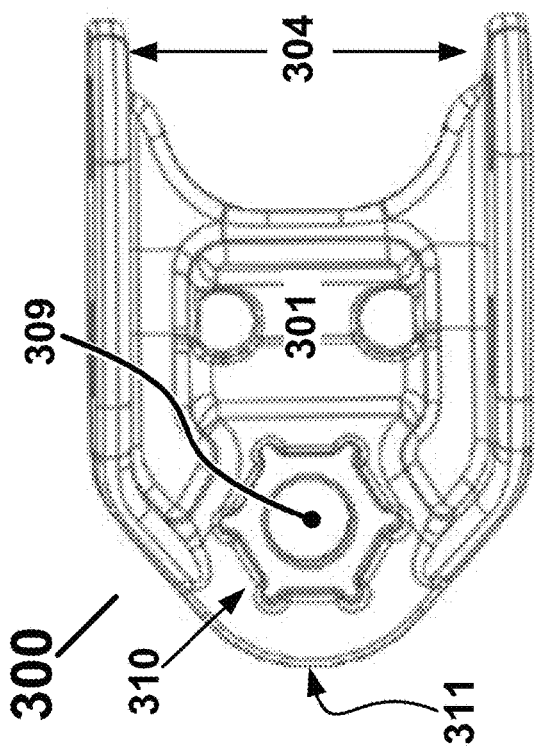
Figure 5A:
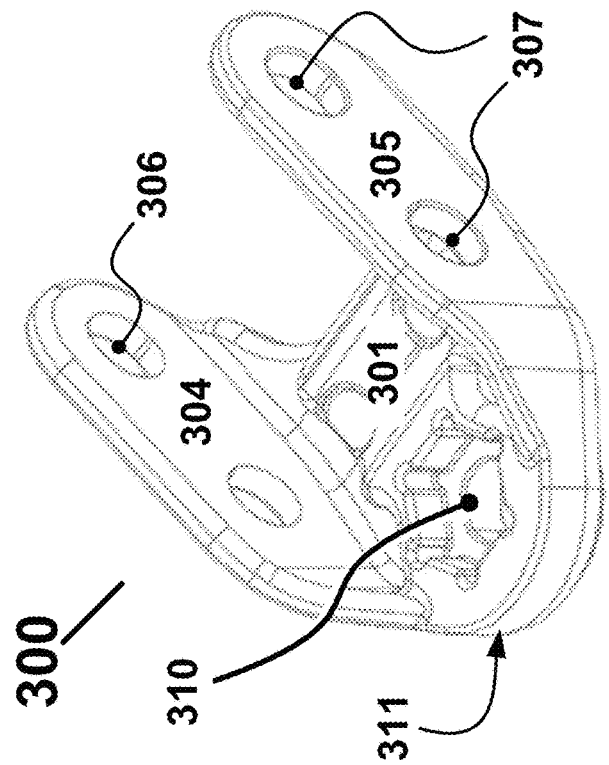
Figure 5B:
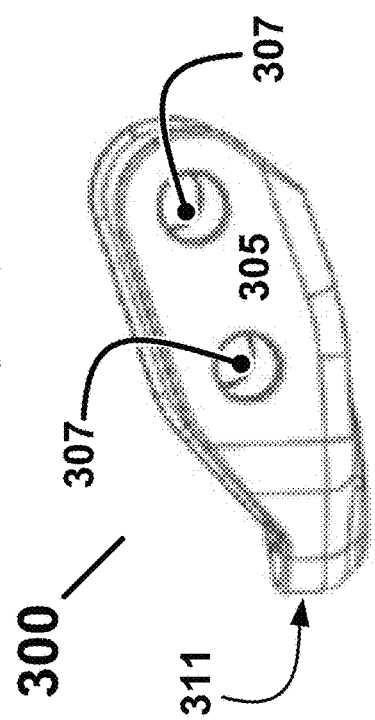

With reference to the exemplary embodiment of FIG. 4, an exemplary A-arm 336 may be illustrated without the bracket 300 interconnected to the weldment 351 thereof. As may be evident from the illustrative embodiment, annulus 352 of weldment 351 of A-arm 336 may operatively connect the knuckle 40 of the vehicle to the remainder of the vehicle upstream of the A-arm 336. As may also be evidence from FIG. 4, an exemplary opening 360 through weldment 351 may allow for more easier removal and/or connection of bracket 300 to an exemplary A-arm 336 by virtue of the fact that half shaft 82 and upper A-arm 34 would otherwise impede access to fasteners 160 in alternative versions of the lower A-arm 36, as disclosed in U.S. Patent Application Publication No. 2023/00608065. In a preferred embodiment, the instant A-arm 336 enables access to and removal of an exemplary bracket 300 without being hindered by other components of the vehicle and vehicle suspension, such as, for example, the drive shaft, the CV joint, or the brake disk.

Referring to the exemplary embodiment of FIG. 5, exemplary bracket 300 may be illustrated from various vantage points to show each of the surface features useable in its operation. In one aspect, an exemplary bracket 300 may have a hexagonal-shaped aperture 310 disposed within the head 311 and/or body 301 of the bracket. In an exemplary embodiment, hexagonal-shaped aperture 310 may substantially restrict rotation of fastener 316 when disposed therein. In an exemplary embodiment, hexagonal-shaped aperture 310 passes through only a portion of the thickness of the head 311 and/or body 301 of an exemplary bracket 300. Opposite the hexagonal-shaped aperture 310 may be an orifice 309, which is configured for rotational and sliding passage of the fastener 316 if not for the rotational limitations imposed on it by aperture 310. In an alternative embodiment, aperture 310 may be circular or rectangular to restrict fastener 316 rotation. In a further alternative embodiment, aperture 310 may provide for passage of a setscrew or other screw/fastener device through the thickness of head 311 and/or body 301 to substantially reduce and/or prohibit movement of fastener 316 therein. Additionally, an exemplary bracket 300 may have arms 304/305 sufficient to enable friction-fit and/or sliding engagement with an exemplary weldment 351 of an exemplary A-arm 336. In an alternative embodiment, the arm surfaces 304 may engage grooves, slats, ridging, or other friction-inducing surfaces on weldment 351, such as, for example, surface 355.

In an exemplary embodiment, the apertures 310 of the A-arm weldment 351 are created at manufacturing, i.e., they do not need to be drilled by the user. Such pre-manufactured apertures 310 may aid the user in easy substitution of the A-arm 336 for stock A-arms of a given vehicle. Furthermore, an exemplary bracket 300 may be on or off the vehicle 10 when the wheels are on the vehicle 10, allowing the vehicle to still function with bracket 300 in place. It is known that the kingpin axis is the axis around which a wheel hub rotates during steering, and it is determined by the geometry of the suspension for the wheel. In an exemplary embodiment, the kingpin axis may be defined by the axis intersecting the pivots/ball joints connecting the upper A-arm with the knuckle holding the wheel hub. Referring to the exemplary embodiment of FIG. 4, an exemplary kingpin axis may be a vertical line running through ball joint 102 of upper A-arm 34. It is desirable to have the ball joints 354 and 186 as close as possible to the kingpin axis to benefit the steering of the vehicle. The greater the offset of the center of the ball joints 354 and 186 of A-arm 336 from the kingpin axis, a tendency exists for the track assembly on one side of the vehicle to drive into the ground while forcing the track assembly on the other side of the vehicle to lift away from the ground. The engagement between an exemplary bracket 300 and weldment 351 of an exemplary A-arm 336 enables a lower profile connection and minimal if any deviation from the kingpin axis for the ball joints comprising the knuckle 40 ball joint and that of the anti-rotation device 80. In a preferred embodiment, the distance between the center of the ball joints 354 and 186 of A-arm 336 is between 0.0 inches and 1.0 inches.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A suspension assembly for an off-road vehicle, comprising:
   an A-arm comprising a first member having a first end and a second end and a second member having a first end and a second end, wherein the first end of the first member and the first end of the second member each rotatably interconnect to a frame of a vehicle about an axis of rotation, and the second end of the first member and the second end of the second member are joined to one another at an interconnection located distal from the axis of rotation, wherein the A-arm comprises an aperture having a central axis substantially parallel to the axis of rotation and through the thickness of the interconnection;
   an annulus disposed on the interconnection proximal to the aperture, wherein the annulus is configured to interconnect a knuckle to the vehicle via the A-arm; and
   a bracket configured to attach to the interconnection of the A-arm, the bracket having a plurality of openings through its thickness, wherein at least one of the plurality of openings is concentric with the aperture when attached to the interconnection of the A-arm and at least one of the plurality of openings is configured to receive a fastener for interconnecting an anti-rotation device to the vehicle via the A-arm.

2. The suspension assembly of claim 1, further comprising at least two apertures in the interconnection each having a central axis substantially parallel to the axis of rotation.

3. The suspension assembly of claim 1, wherein the annulus is substantially aligned with a central axis of the at least one of the plurality of openings configured to receive the fastener for interconnecting the anti-rotation device.

4. The suspension assembly of claim 1, further comprising a track kit comprising the anti-rotation device and interconnected to the A-arm via the anti-rotation device and via the knuckle.

5. The suspension assembly of claim 1, further comprising at least one ball joint interconnected to one of the annulus and at least one of the plurality of openings in the bracket.

6. The suspension assembly of claim 5, wherein a distance between the at least one ball joint and the kingpin axis of the vehicle is between 0 inch and 1 inch.

7. The suspension assembly of claim 1, wherein the bracket is a U-shaped structure and at least one of the plurality of openings is through a thickness of an arm of the bracket and at least one of the plurality of openings is through a thickness of a head of the bracket.

8. The suspension assembly of claim 7, wherein the at least one of the plurality of openings in the arm of the bracket is concentric with the aperture when the bracket is coupled to the interconnection of the A-arm.

9. The suspension assembly of claim 7, wherein the at least one of the plurality of openings in the head of the bracket has a hexagonal cross-section through a portion of the thickness of the bracket.

10. The suspension assembly of claim 9, wherein the at least one of the plurality of openings in the head of the bracket has both a hexagonal cross-section and a circular cross-section through the thickness of the bracket.

11. The suspension assembly of claim 10, further comprising a track kit interconnected to the A-arm via the anti-rotation device.

12. The suspension assembly of claim 10, further comprising at least one ball joint interconnected to one of the annulus and at least one of the plurality of openings in the bracket.

13. The suspension assembly of claim 12, wherein the at least one ball joint is substantially aligned on the kingpin axis of the vehicle.

14. The suspension assembly of claim 13, further comprising a track kit interconnected to the A-arm via the anti-rotation device.

15. A method of assembling an anti-rotation device to a vehicle suspension, comprising the steps of:
   interconnecting an anti-rotation device via a hexagonal opening in a bracket, wherein the bracket has a U-shaped structure and two arms in which a plurality of openings are found therethrough; and
   attaching the bracket to a weldment of an A-arm that is operationally coupled to a vehicle, wherein the weldment comprises a plurality of apertures configured to align with each of the plurality of openings in the arms of the bracket, wherein
   each of the plurality of apertures in the weldment have a central axis that extends in a plane that is parallel with a plane of the surface on which the vehicle is at rest.

16. The method of claim 15, further comprising the step of interconnecting a knuckle to the weldment of the A-arm via an annulus of the weldment.

17. The method of claim 15, further comprising the step of aligning a ball joint interconnected to the bracket with a kingpin axis of the vehicle.

18. The method of claim 15, further comprising the step of interconnecting a track kit to the vehicle via the A-arm and the anti-rotation device.

19. A track conversion bracket, comprising:
   a U-shaped structure having two arms, a body, and a head;

a hexagonal-shaped aperture located partially into the thickness of the head, the body, or combinations thereof, a plurality of circular apertures through the thickness of each of the two arms with axes in a plane that is perpendicular to a plane in which an axis of the hexagonal-shaped aperture is found; and a circular aperture concentric with the hexagonal-shaped aperture.

20. The track conversion bracket, wherein the arms are spaced apart from one another by the width of the body.

* * * * *